April 27, 1965   P. J. MEEKS   3,180,084
THRUST DEVICE
Filed Feb. 13, 1961   2 Sheets-Sheet 1
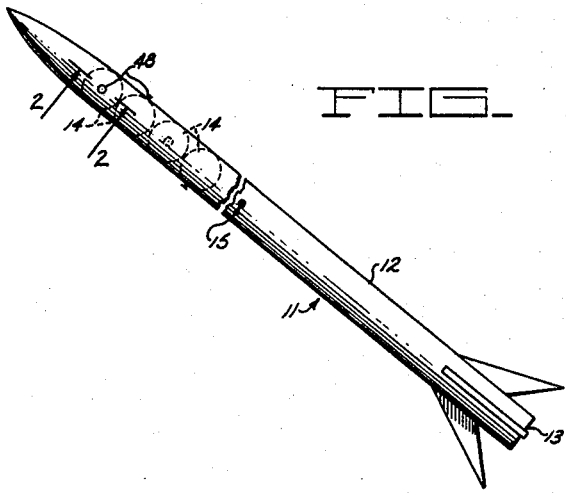
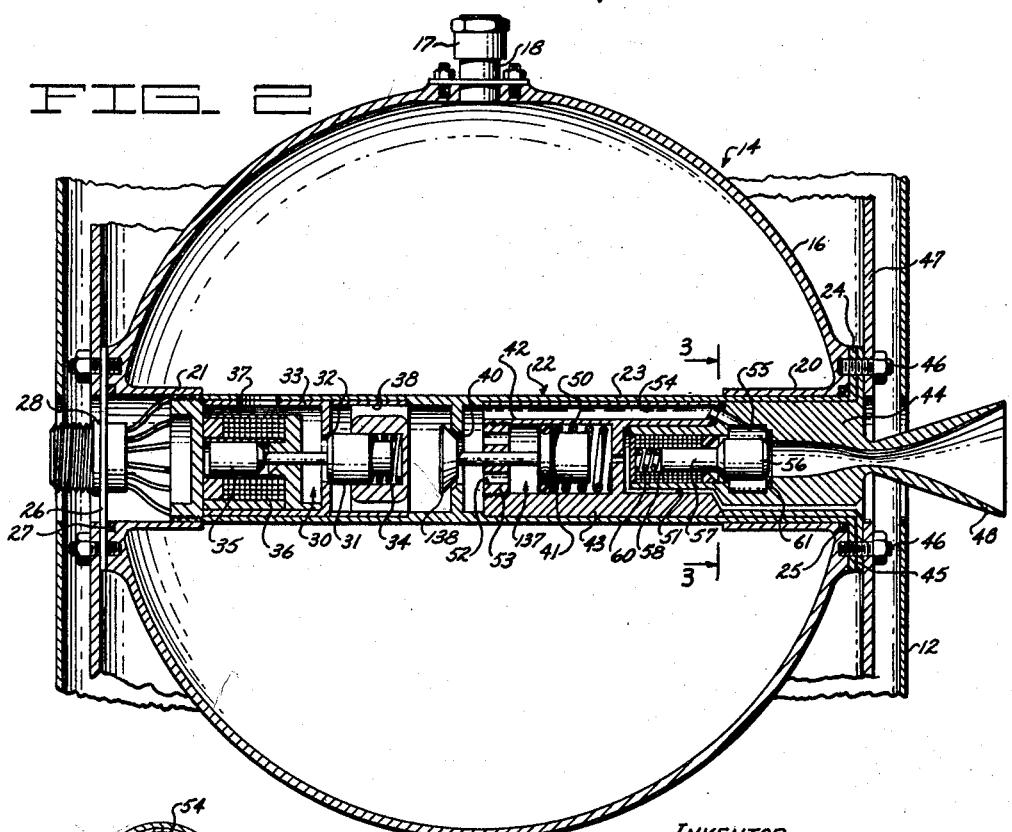
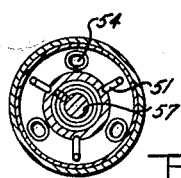
INVENTOR
PAUL J. MEEKS
BY *Fred N. Schwend*
ATTORNEY April 27, 1965   P. J. MEEKS   3,180,084
THRUST DEVICE Filed Feb. 13, 1961   2 Sheets-Sheet 2

INVENTOR
PAUL J. MEEKS
BY
ATTORNEY

United States Patent Office 3,180,084
Patented Apr. 27, 1965

3,180,084
THRUST DEVICE
Paul J. Meeks, Altadena, Calif., assignor to Clary Corporation, San Gabriel, Calif., a corporation of California
Filed Feb. 13, 1961, Ser. No. 88,757
5 Claims. (Cl. 60—35.5)

This invention relates to thrust devices, commonly called "thrustors," for maneuvering and/or propelling vehicles such as space craft, including rockets, space satellites, etc.

In such vehicles, weight, space requirements and reliability of operation under widely varying conditions are of prime importance. Heretofore, thrustors of the above type have generally comprised one or more containers of propellant fluid under pressure, which containers are connected through suitable plumbing to pressure regulator valves, line valves, etc., provided for controlling the flow of gas to a nozzle generally mounted on the vehicle body and having its outlet extending exteriorly of the body. The various valves are generally mounted either on the outside of the container or on the framework of the vehicle.

In order to provide for operation of the thrustor over a long period of time without refilling, the gas is generally compressed under a relatively high pressure, for example, 5000 pounds per square inch. This requires relatively thick walled valves and piping to withstand such pressure which greatly adds to the weight of the entire system with consequent lowering of the permissible pay load. Also, such valves, piping and other parts of the system take up valuable space.

In addition, many valves and other thrustor control devices are either vented to the exterior or have working parts exposed to the exterior environment with the result that such devices are subject to contamination and possible damage from such uncontrolled and unknown elements as radiation, gases, etc.

A principal object of the present invention is to reduce the weight of a thrustor system of the above type.

Another object is to reduce the displaced volume and consequent space requirements of a thrustor system.

Another object is to increase the reliability of operation of a thrustor system.

A further object is to facilitate installation and removal of a thrustor system in a vehicle.

The manner in which the above and other objects are accomplished will be readily understood on reference to the following specification when read in conjunction with the accompanying drawings, wherein:

FIG. 1 is a side view of a rocket embodying one form of the present invention.

FIG. 2 is a sectional view of a thrustor unit and is taken substantially along the line 2—2 of FIG. 1.

FIG. 3 is a transverse sectional view through the valve unit and is taken substantially along line 3—3 of FIG. 2.

Figure 4:
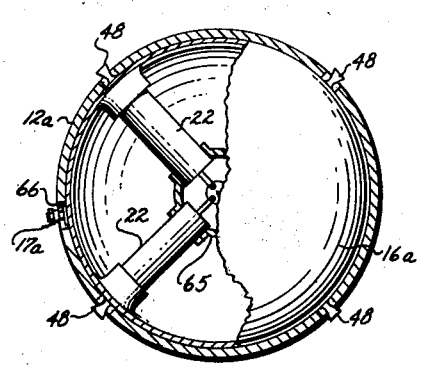
FIG. 4 is a transverse sectional view through a rocket illustrating a modified form of the invention wherein four valve units are mounted in one container.

Referring particularly to FIGS. 1, 2 and 3, a rocket 11, chosen for illustration in connection with the present invention, comprises an elongated cylindrical casing or shell 12 which is pointed at its forward end and terminates at its rear end in a discharge opening 13 forming part of a suitable propulsion unit (not shown) for advancing the rocket through space.

Spaced within the casing 12 is a series of thrustor units, generally indicated at 14, located forwardly of the center of gravity 15 of the rocket.

According to the present invention, each thrustor unit 14 comprises a spherical container 16, preferably of titanium or beryllium, having a suitable removable filler plug 17 and connection 18 whereby the container may be filled with suitable propellant gas, such as helium or nitrogen, under a relatively high pressure, for example, 5,000 pounds per square inch. The container 16 is formed with diametrically aligned hubs 20 and 21 forming coaxially extending cylindrical openings.

A valve unit generally indicated at 22 is slidably fitted in the openings in the hubs to form a complete self-contained thrustor unit. The valve unit 22 comprises a tubular housing 23 slidably fitted within both hubs 20 and 21 and provided with a flange 24 for attachment to the right-hand side of the container. An O-ring 25 prevents leakage of gas along the outer periphery of the housing adjacent the flange.

The opening formed by the hub 21 is covered by a plate 26 and is sealed by an O-ring 27. The plate 26 carries an electrical connector 28 having wires connected to different electromagnetically operated valves within the valve unit 22, as will be described presently. The connector 28 is accessible from the exterior of the rocket casing 12 to facilitate testing and control of the thrustor unit.

The foregoing construction enables the container 16 to expand and contract in accordance with temperature and pressure differentials while allowing the valve unit 22 to slide within the opening in hub 21. Thus, the valve unit is not subject to strain resulting from distortion of the container.

An electromagnetically operable valve, generally indicated at 30, is mounted in the housing 23. The latter comprises a reciprocal poppet member 31 extending coaxially of the housing and cooperable with an annular valve seat 32 formed in a sleeve element 33 which is fitted and clamped within the left-hand end of the housing. A compression spring 34 normally holds the valve closed.

A solenoid unit 36 is suitably attached within the sleeve element 33 and its coil cooperates with an armature 35 attached to the poppet 31. The solenoid coil is electrically connected to the connector 28.

Energization of the solenoid 36 will move the poppet 31 to the right to permit propellant gas passing through aligned openings 37 in the housing 23 and sleeve member 33, to move past the poppet and through passages 38 into a pressure regulator valve, generally indicated at 137. The latter comprises a poppet 138 cooperable with an annular valve seat 40. The poppet is removably attached to a piston 41 slideable in a cylinder 42 formed in a cylindrical valve casing 43 which is fitted within the valve housing 23 and is held in place by a nozzle element 44. The latter is also fitted within the housing 23 and is provided with a flange 45 secured to the flange 24 and to the framework 47 of the rocket by bolts 46. The nozzle element terminates in a nozzle 48 which extends through an opening in the rocket casing 12.

The poppet 138 of the pressure regulator valve is located coaxially of the valve housing and is urged to the left by a compression spring 50 toward open position. However, the poppet is controlled in position by the differential between the pressure existent in the interior of the container 16 and that existent on the exterior. For this purpose, a passage 51 is formed coextensively through the nozzle element 44 and valve casing 43 to the right-hand side of the cylinder 42. The left-hand side of this cylinder communicates with the downstream side of the poppet 138 through openings 52 formed in a bearing member 53 which is threadably attached to the valve casing 43.

The downstream side of the poppet 138 communicates through a plurality of passages 54 (see also FIG. 3) with the inlet port of a thrust control valve, generally indicated at 55. The latter comprises a poppet 56 extending coaxially of the housing and having an armature 57 which is cooperable with a solenoid 58. The coil of this solenoid is connected through suitable connectors (not shown) with the electrical connector 28. A compression spring 60 normally holds the poppet in a closed position wherein it engages an annular valve seat 61 formed in the nozzle element 44. The latter seat is preferably formed of a resilient ring of rubber or similar material whereby a fluid tight seal having zero leakage may be effected.

In order to operate the thrustor, the valve 30 may be opened its full extent and the control valve 55 thereafter opened to an extent dependent upon the amount of thrust desired. The pressure regulator maintains the gas applied to the control valve 55 at a constant pressure. As the propellant gas passes through the nozzle 48, it develops a reaction which applies a force against the rocket tending to change its attitude about its center of gravity 15. Accordingly, the amount of thrust developed will be proportional to the amplitude of the electrical energy applied to the coil of the control valve 55.

As shown in FIG. 1, the nozzles 48 of the various thrustor units preferably extend in different radial directions about the axis of the rocket so that by actuating different ones of such units, the roll, yaw or pitch attitude of the rocket or space craft may be controlled as desired.

It will be noted from the foregoing that the various valves 30, 55 and 137 are located in series, coaxially of the valve housing 23, so as to provide a compact valve unit which takes up a minimum amount of space and results in a minimum amount of weight.

Since the valve unit 22 is retained wholly within the container 16, no piping or plumbing is necessary between the various valves or between the container and such valves, thereby effecting considerable weight reduction. Also, since the various valves are constructed in one unit, the overall weight is further minimized. In addition, such weight reduction is further realized by the fact that the various operating components are formed within a cylindrical housing which is subject to the compressive force of the propellant gas within the container, such cylindrical form providing a maximum strength with minimum wall thickness. Further, and of considerable importance, is the fact that since the valves are located within the container 16, they are not all subject to the pressure differential between the interior of the container and the exterior. Consequently, the wall thicknesses of such valves and their housing may be made much smaller and of a lighter weight material than would be the case if such valves were mounted outside the container.

It will be noted that since all of the control elements, i.e., valves, etc., are located within the container 16, they are subjected only to exposure of the known and filtered propellant gas and are thus protected from contamination and/or damage from outside and unknown elements which might otherwise cause malfunctioning.

Although the container 16 could be made in shapes other than spherical, the spherical shape provides the greatest bursting strength for a given wall thickness, and for this reason it is preferred.

FIG. 4 illustrates a modified form of thrustor unit wherein four valve units 22, with their respective nozzles 48, are mounted in a single large spherical container 16A. In this case, the inner ends of the valve units are slideably fitted in slide bearings formed in a spider 65 suitably supported in the interior of the container. The four valve units extend radially outwardly at 90° from each other so that control of the travel of the rocket may be effected in any direction.

Preferably, the fill plug 17a of the container is located in a plane passing through the various valve units and extends through an opening 66 in the casing 12a of the rocket so that the container may be filled from the exterior of the rocket while it is placed in the rocket.

Figure 7:
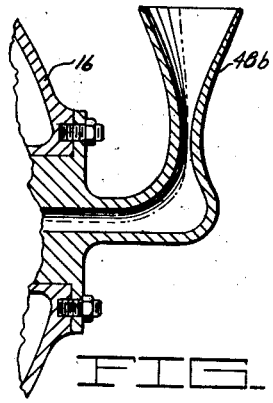
FIG. 7 is a sectional view through a modified form of nozzle arranged to effect rolling of a rocket.

If desired, the nozzles may be modified as shown at 48b, FIG. 7, to extend at 90° from the axis of the valve unit so as to effect a rolling action of the rocket about its longitudinal axis. Conversely, the nozzles may be turned to extend parallel to the axis of the rocket so as to aid or oppose forward movement thereof.

Figure 5:
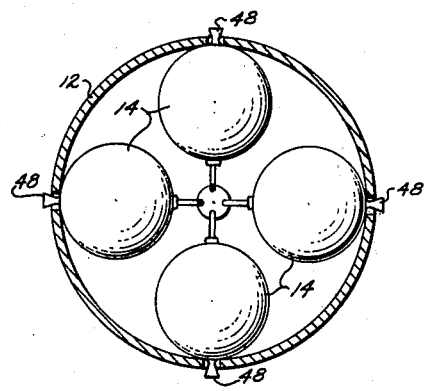
FIG. 5 is a transverse sectional view through a rocket illustrating an arrangement wherein four thrustor units are spaced around the interior of a missile body to enable selective movement of the rocket in any of four directions.

FIG. 5 illustrates a modified form of the invention which is particularly applicable to larger rockets. In this case, four thrustor units 14 are located in a circle around the inside of the rocket casing, the nozzles 48 extending radially outwardly at 90° from each other to effect directional control.

Figure 6:
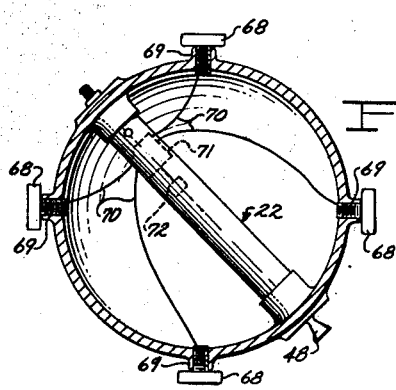
FIG. 6 is a sectional view through another modified form of thrustor unit.

FIG. 6 illustrates a hot gas type thrustor unit wherein a plurality of solid propellant units 68 are suitably mounted in couplings 69 on the container. The units are connected by electrical conductors 70 to a suitable sequence control device 71 mounted inside the valve unit 22. The latter is controlled by a suitable pressure sensitive device, generally indicated at 72. Such devices are well known in the art and the details thereof have accordingly been omitted herein for the sake of brevity.

Upon application of a suitable signal, the sequence control device 71 is actuated to cause ignition of one of the propellant units which will generate a propellant gas within the container. After the gas pressure within the container has decreased to a predetermined level due to usage, the pressure sensitive device 72 will actuate the sequence control device 71 to ignite another of the propellant units, etc., thereby maintaining a relatively constant supply of propellant gas within the container.

Figure 8:
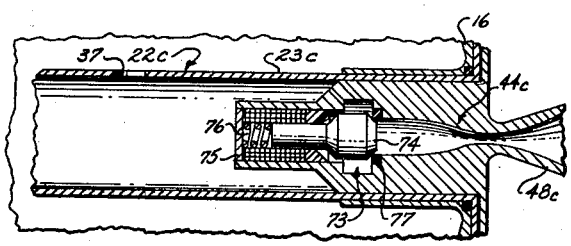
FIG. 8 is a sectional view through a modified form of valve unit.

FIG. 8 illustrates a modified form of valve unit 22c wherein a single control valve 73 is provided to control the flow of gas from the interior of the container through the nozzle 48c. The valve comprises a poppet 74 controlled by a solenoid 75. A compression spring 76 normally maintains the poppet seated against a valve seat 77 in the nozzle unit 44c. The latter is fitted in and suitably attached to the valve housing 23c.

The valve 73 is preferably controlled by square pulses under control of the pressure existent in the container. That is, when a relatively high pressure exists in the container, the pulse length will be short, but as the pressure is reduced due to use, variation in temperature or the like, the pulse length becomes longer.

Although the invention has been described herein in detail and certain specific terms and languages have been used, it is to be understood that the present disclosure is illustrative rather than restrictive and that changes and modifications may be made without departing from the spirit or scope of the invention as set forth in the appended claims.

Having thus described the invention, what is desired to secure by United States Letters Patent is:

1. A self-contained thrust producing device for space craft or the like comprising a container for containing a propellant fluid under pressure, said container being adapted to expand and contract, said container having aligned first and second openings therein, a control device removably mounted in said openings, means securing said control device to said container adjacent said first opening, said control device sealing said first opening and being slideable in said second opening as an incident to expansion and contraction of said container, an outlet nozzle on said control device opening to the exterior of said container, said control device having an outlet communicating with said nozzle and an inlet communicating with the interior of said container, said control device comprising electromagnetically operable means for controlling the flow of fluid therethrough; and means including an electrical connector on said container and sealing said second opening, said connector being electrically connected to said electromagnetically operable means, and said connector being accessible from outside said container.

2. A self-contained thrust producing device comprising a spherical container for containing a propellant fluid under pressure, said container being effective to expand and contract in response to changes in pressure therein, said container having an opening therein, a cylindrical housing removably fitted in said opening and extending within said container, an outlet nozzle on said housing and opening to the exterior of said container, a fluid valve device in said housing having an outlet communicating with said nozzle and an inlet communicating with the interior of said container, said valve device having a bore extending coaxially of said housing, an annular valve seat in said housing extending coaxially thereof and communicating with said outlet, a valve member slideable in said bore and engageable with said valve seat; and means for moving said valve member toward and away from said valve seat.

3. A self-contained thrust producing device comprising a spherical container for containing a propellant fluid under pressure, said container being effective to expand and contract in response to changes in pressure therein, said container having an opening therein, a cylindrical housing removably fitted in said opening and extending within said container, said housing having an opening extending axially thereof and communicating at one end with said nozzle and at the other end with the interior of said container, a plurality of valve seats spaced along said opening, valve members movable axially in said opening and cooperable with respective ones of said valve seats, and means for moving said valve members relative to said valve seats for controlling flow of said fluid from said container to said nozzle.

4. A self-contained thrust producing device comprising a spherical container for containing a propellant fluid under pressure, said container being effective to expand and contract in response to changes in pressure therein, said container having diametrically opposed first and second openings therein, a housing fitted in said openings, means securing said housing to said container adjacent said first opening, said housing sealing off said first opening and being slideable in said second opening as an incident to expansion and contraction of said container, an outlet nozzle on said housing opening to the exterior of said container, an electromagnetically operable valve device in said housing, said valve device having an outlet communicating with said nozzle and an inlet communicating with the interior of said container; and means including an electrical connector sealing said second opening, said connector being electrically connected to said electromagnetically operated valve device.

5. A self contained thrust producing device comprising a spherical container for containing propellant fluid under pressure, said container being effective to expand and contract, said container having diametrically opposed first and second openings therein, a housing adapted to be fitted in said openings, means for securing said housing to said container adjacent said first opening, said housing being adapted to seal off said first opening and being slideable in said second opening as an incident to expansion and contraction of said container, an outlet nozzle on said housing opening to the exterior of said container, valve means in said housing for controlling flow of said fluid from the interior of said container to said nozzle, and means independent of said housing for sealing said second opening.

References Cited by the Examiner

UNITED STATES PATENTS

| 2,730,626 | 1/56 | Varney | 244—97 |
| 2,822,755 | 2/58 | Edwards et al. | 102—50 |
| 2,952,207 | 9/60 | Kamimoto | 102—50 |
| 2,974,594 | 3/61 | Boehm | 60—35.54 |
| 2,991,027 | 7/61 | Geyling | 244—1 |

FOREIGN PATENTS 879,835 12/42 France.

FERGUS S. MIDDLETON, Primary Examiner.

SAMUEL FEINBERG, Examiner.